Oct. 23, 1956 L. BRÜCK ET AL 2,768,297

ULTRA-SHORT WAVE OSCILLATOR

Filed July 12, 1949

INVENTORS
LOTHAR BRÜCK
OSKAR DOEHLER
WERNER KLEEN
BY Paul B. Hunter
ATTORNEY

United States Patent Office 2,768,297

Patented Oct. 23, 1956

2,768,297

ULTRA-SHORT WAVE OSCILLATOR

Lothar Brück, Oskar Doehler, and Werner Kleen, Paris, France, assignors to Compagnie General de Telegraphie Sans Fil, a corporation of France Application July 12, 1949, Serial No. 104,282

Claims priority, application France July 29, 1948

6 Claims. (Cl. 250—36)

Figures 1, 2, 3:
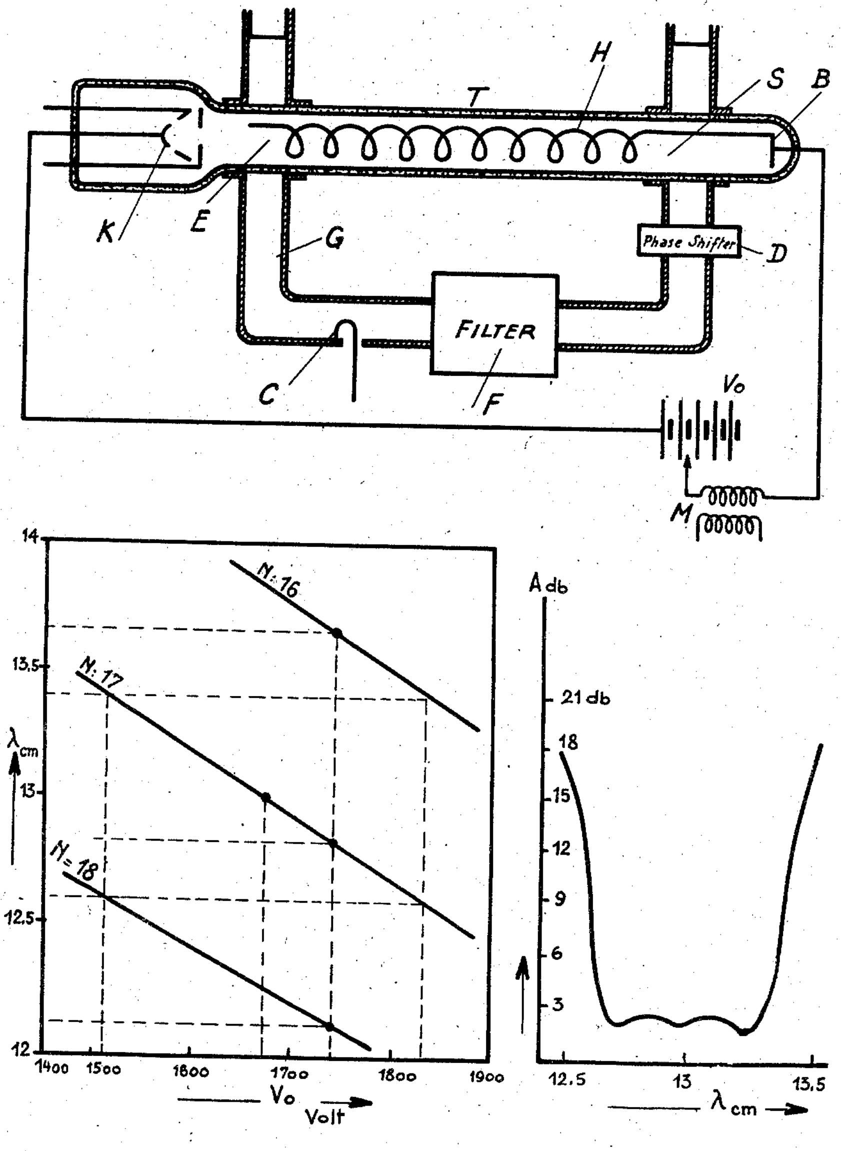

The present invention relates to an oscillator which is intended for use in particular in the field of decimetric and centimetric waves.

The principal object of the present invention is to provide a novel oscillator of the traveling wave type, the wavelength of which can be tuned by varying an applied D. C. voltage, without its being necessary to act on an oscillating circuit by mechanical means. It is obvious that a method for varying the wavelength of an oscillator, which does not require any variation of the resonant frequency of an oscillating circuit by a mechanical method but which uses the variations of a voltage, has numerous advantages.

It is known to vary the frequency of operation by acting on a voltage applied to the oscillator, in particular in reflex-klystrons which are often used in the technique of radar or in multiplex systems. In the reflex klystron, the variation of the excited frequency is obtained by varying the D. C. voltage of the reflector electrode, but the frequency variation obtained does not exceed a relative value of about 1%, since the range within which it is possible to effect a variation of frequency by acting on the voltage of the reflector, i. e. the electronic band-pass, is, for $f$=3,000 mc./s. ($\lambda$=10 cm.) for example, 10 mc./s. to 30 mc./s. at the most. The electronic band-pass of the oscillator according to the present invention can be made substantially higher than this value. Furthermore, the variation of the frequency in a reflex klystron normally has hysteresis, i. e. when the voltage of the reflector electrode is varied, for a given value of said voltage the frequency may be of different values according to the direction of variation of voltage. This disadvantageous effect practically does not exist in the oscillator made according to the present invention.

The accompanying Fig. 1 shows diagrammatically the principle of the invention, while Figs. 2 and 3 show explanatory diagrams.

The novel oscillator comprises a travelling or progressive wave tube which is provided with a novel reaction channel between the output and the input of said tube, said reaction channel comprising a transmission line containing a band-pass filter and an adjustable phase-shifter. The diagram of such an oscillator is shown in Fig. 1, wherein T represents a travelling-wave tube with the input E and the output S, G is any type of transmission line for example a wave-guide which is adapted to act as a reaction channel and in which are inserted a filter F and a phase-shifter D. C represents any type of coupling for the oscillator load, for example a loop inserted in the wave-guide G. The voltage applied between the cathode K and the retardation line H of the tube is $V_0$, said voltage being adjustable by any suitable means shown symbolically by a slider on the source $V_0$. A transformer M for optionally introducing a modulating voltage is inserted in the supply wire of the collector B which is connected to the line H.

According to the measurements and the calculations which we have effected, the behaviour of such an oscillator is as follows:

As is well known, a travelling-wave tube comprises a retardation line skirted by an electron beam which interacts with an electromagnetic wave of which the amplitude increases from the input to the output, the electrons of the electron beam transferring energy to the wave. The attenuation of the retardation line of the travelling-wave tube is sufficiently great to prevent self-oscillation of the tube in the absence of an outside reaction channel, i. e. the wave which is amplified and reflected at the output owing to a possible lack of matching is very greatly attenuated along its return travel and does not contribute to the oscillation at the input. The gain of the tube is higher than 1.

In any oscillator which is excited by means of an outside reaction channel, only the frequencies are excited for which the phase difference between the input voltages and the reaction voltage at the input is given by:

$$\phi=2\pi N \qquad (1)$$

wherein N is a whole number. This is a condition which has to be satisfied for any oscillator which is excited by means of any reaction.

In a travelling-wave tube, the phase velocity depends on the velocity of the electrons:

$$v_0=\sqrt{\frac{2e}{m}}\sqrt{v_0} \qquad (2)$$

wherein $V_0$ is the D. C. voltage applied to the retardation line. If $V_0$, and therefore $v_0$, is varied, the velocity of propagation of the wave is also altered. For equating the variation of frequency with $V_0$, the existence of the filter F, the phase-shifter D and the coupling C of the load will first of all be negletced. Assume that $l$ is the length of the retardation line. The phase difference between the field at the output and the field at the input of the tube is then given by:

$$\phi_1=2\pi\frac{c}{v_p}\frac{l}{\lambda} \qquad (3)$$

wherein $\lambda$ is the wavelength in the free space, $c$ the velocity of light, $v_p$ the velocity of propagation which, as hereinbefore mentioned, depends on $v_0$. If the reaction guide is of a length $l_g$ and if the wavelength considered is shorter than the critical wavelength of the guide, the phase difference of the fields between the points S and E of Fig. 1 is given by:

$$\phi_2=2\pi\frac{l_g}{\lambda} \qquad (4)$$

The total phase difference is the sum of $\phi_1$ and $\phi_2$, which gives the equation that determines the condition for self-oscillation:

$$\frac{l_g}{\lambda}+\frac{c}{v_p}\frac{l}{\lambda}=N \qquad (5)$$

In this equation $l$, $l_g$, $c$ and N are constants. If $v_p$ is changed by varying $v_0$, this equation can only be satisfied by a variation of $\lambda$. It therefore follows that a variation of $V_0$ involves a variation of $\lambda$ and the oscillator can therefore be tuned by varying the applied D. C. voltage. Self-oscillation occurs if the product of the gain and of the attenuation of the wave in the helix is greater than 1, a condition which is normally satisfied since the tube operates as an amplifier with a gain which is higher than 1.

In reality, this conception is simplified, since it does not take into account the additional phase difference introduced by the couplings of the guide at the output and at the input of the tube. But this additional phase difference only produces a quantitative change in the mechanism of the oscillation and does not alter the reasoning which explains the principle thereof.

However, the measurements we have effected have shown that such an oscillator wherein the reaction channel is a guide, i. e. an element without selectivity, cannot be used in practice. There are a number of frequencies which can be excited for a given voltage $V_0$, and it depends on uncontrollable effects as to which of such frequencies is actually excited.

Self-oscillation will occur if the equation (5) is satisfied and if the gain of the tube, which is a function of the wavelength $\lambda$, is higher than 1. These two conditions are not satisfied for a single value of N but for a large number of different values of N, since the gain of a travelling-wave tube only depends very slightly on the wavelength. This is expressed by Fig. 2 which shows the curves $\lambda=f(V_0)$ for various values of N, for example $N=16$, 17 and 18. If for example $V_0=1740$ volts, $\lambda$ may be equal to 12.1 or 12.8 or 13.6 cm., and since the gain within this range of 12.1 to 13.6 cm. is practically constant it is found that, because of conditions that cannot be predetermined, now one, now another of these wavelengths is excited. It is possible to determine experimentally the shape of these curves by inserting in the reaction guide an oscillating circuit with a high Q-factor (a cavity), and for each value of resonant wavelength of said cavity a plurality of different values of D. C. voltage are found for which there is self-oscillation on a wavelength which is approximately equal to the resonant wavelength of the cavity. A number of modes of oscillation therefore exist, each mode being characterised by a whole number N, and with a difference of wavelength between the adjacent modes which, in the case of the example of Fig. 2, is about $2\Delta\lambda=0.8$.

It follows that it is possible to avoid the uncertainty of the frequencies excited as between different possible values thereof, by introducing according to the present invention into the reaction channel, a selective element with a band-pass F such that a single mode is within the band. This effect is obtained by inserting in the circuit of the reaction guide a band-pass filter as of the cavity type disclosed in "Radar Beacons" Rad. Lab. Series #3 of 1947, pages 145 and 146, the band-pass of which is not larger than the space between two modes. Preferably, the attenuation of said filter as a function of the wavelength should be of very low value in the space between two modes, with a very great increase at the edges of said space. In order to obtain with a device that corresponds to the curves of Fig. 2, an electronic tuning band between 12.6 and 13.4 cm., a filter may for example be inserted which has a characteristic such as that of Fig. 3 which shows the attenuation A as a function of the wavelength. It should be noted that the band-pass of this filter is so located with respect to the modes $N=16$, $N=17$ and $N=18$ that, within the predetermined voltage limits, for example between 1500 and 1830 volts, there is only one possible mode of oscillation, viz. $N=17$.

The insertion of a filter in the reaction channel naturally restricts the electronic tuning band to the band-pass of said filter; however, in the example of Figs. 2 and 3, this electronic tuning band already extends from 12.6 to 13.4 cm., i. e. $\Delta\lambda=0.8$ cm., $\Delta\lambda/\lambda=6\%$ which is a much higher value than the value of 1% mentioned for the reflex klystron.

In an oscillator wherein the tube and the filter have the properties indicated in Figs. 2 and 3, the excited frequency is quite definite, there is only one wavelength which is excited for each value $V_0$, and $\lambda$ varies continuously from 12.6 to 13.4 cm. if $V_0$ varies from about 1830 to 1500 volts.

However, tests have shown that in tubes of the same series constructed with the same dimensions, such a continuous variation of $\lambda$ as a function of $V_0$ is not identical even if a band-pass filter is inserted in the reaction guide. This effect can be explained by the fact that the position of the modes, i. e. of the curves $\lambda=f(V_0)$ of Fig. 2 is changed by small uncontrollable differences in the construction of the tube. If, for example, each mode of Fig. 2 is shifted $\Delta\lambda=0.5$ cm. it is found that there is not a single mode (N=17) within the band-pass of the filter 12.6 to 13.4, but two modes ($N=16$ and 17 for example). By varying $V_0$, the wavelength jumps from one mode to the other for a definite value of $V_0$.

This effect can be eliminated according to the invention by means of the phase-shifter D shown in Fig. 1. Said phase-shifter may be of a type disclosed in "Radar Beacons" Rad. Lab. Series #3 of 1947, page 148 and is so adjusted, for the frequency of oscillation of a given tube, that a single mode is contained within the band-pass of the filter, which band-pass is smaller than the space between the modes. In Fig. 2, the effect of the phase-shifter can be shown as a vertical displacement of all the curves $\lambda=f(V_0)$ and it is possible to prevent the undesirable modes of oscillation if the phase-shifter enables an additional phase difference of $\pm\pi$ to be obtained.

As regards the application of the oscillator described, its advantage is not only of enabling mechanical tuning to be replaced by electronic tuning which is simpler. The oscillator can also be applied to frequency-modulation, the modulating voltage being superimposed on the constant D. C. voltage $V_0$ by means of the transformer M.

What we claim is:

1. A tunable ultra-short wave oscillator, comprising a traveling-wave tube having a cathode, a collector, a retardation line disposed between said cathode and said collector, an input channel located adjacent the end of said retardation line near said cathode, and an output channel located adjacent the end of said retardation line near said collector, a source of potential connected between said collector and said cathode for supplying said collector with a positive voltage with respect to the cathode, means for adjusting the supply voltage of said source to tune said oscillator, a transmission line reaction channel connected between the input and the output of the tube, and a band-pass filter located in said transmission line reaction channel and having a band-pass characteristic which is narrower than the frequency interval between two adjacent modes of oscillation of the system, the limits of said band-pass corresponding to but one possible mode of oscillation within the predetermined adjustable supply voltage limits of said source applied to said collector.

2. A tunable ultra-short wave oscillator, comprising a traveling-wave tube having a cathode, a collector, a retardation line disposed between said cathode and said collector, an input channel located adjacent the end of said retardation line near said cathode, and an output channel located adjacent the end of said retardation line near said collector, a source of potential connected between said collector and said cathode for supplying said collector with a positive voltage with respect to the cathode, means for adjusting the supply voltage of said source to tune said oscillator, a transmission line reaction channel connected between the input and the output of the tube, a band-pass filter located in said transmission line reaction channel and having a band-pass characteristic which is narrower than the frequency interval between two adjacent modes of oscillation of the system upon adjustment of said supply voltage as applied between said collector and cathode, and a phase-shifter also located in said reaction channel for adjusting the phase variation over the whole of the reaction channel within the limits $\pm\pi$ to thereby limit the oscillations of said tube to but one mode.

3. An ultra-short wave oscillator of adjustable frequency, comprising a traveling-wave tube having a cathode, a collector, a retardation line disposed between said cathode and said collector, an input channel located adjacent the end of said retardation line near said cathode, and an output channel located adjacent the end of said retardation line near said collector, a source of potential connected between said collector and said cathode for supplying said collector with a positive voltage with respect to the cathode, a wave guide reaction channel connected between the input and the output of the tube, a band-pass filter connected in said reaction channel and having a band-pass characteristic which is narrower than the frequency interval between two adjacent modes of oscillation of the system, and means for varying the voltage produced by said source of potential in order to tune the oscillation frequency of the system, said band-pass filter serving to limit the tuning range of said oscillator to but one possible mode of oscillation within the predetermined adjustable supply voltage limits of said source applied to said collector.

4. A tunable oscillator for frequency-modulated ultra-short waves, which comprises a traveling-wave tube provided with a cathode, a collector, a retardation line disposed between said cathode and said collector, an input channel located adjacent the end of said retardation line near said cathode, and an output channel located adjacent the end of said retardation line near said collector, a source of potential connected between said collector and said cathode for supplying said collector with a positive voltage with respect to the cathode, means for adjusting the supply voltage of said source to tune said oscillator, a wave guide reaction channel between the input and the output of the tube, a band-pass filter connected in said reaction channel and having a band-pass characteristic which is narrower than the space between two adjacent modes of oscillation of the system, and means connected between said source of potential and said collector for superimposing an A. C. voltage on the supply voltage of the collector in order to frequency modulate the oscillations of the tube.

5. An ultra-high frequency oscillator tube having an input, a cathode adjacent said input for producing a stream of electrons, an output, a retardation line interconnecting said input and output, a collector electrode for said electrons adjacent said output, means for supplying said collector with a positive supply voltage with respect to said cathode, a feed-back connection between said output and input, a band-pass filter connected in said feed-back connection for limiting the oscillation of said tube to but one mode, means for varying said supply voltage in order to tune the oscillation frequency of the tube, and a phase shifter connected in said feed-back connection for enabling the tuning of said oscillator through the full range of said one mode of oscillation.

6. An electronic tube as defined in claim 5 wherein transformer means is provided for superimposing an A. C. signal voltage on said supply voltage in order to modulate the oscillations of said tube.

References Cited in the file of this patent

UNITED STATES PATENTS

| | | |
|---|---|---|
| 2,088,749 | King | Aug. 3, 1937 |
| 2,367,295 | Llewellyn | Jan. 16, 1945 |
| 2,409,992 | Strobel | Oct. 22, 1946 |
| 2,442,662 | Peterson | June 1, 1948 |
| 2,452,075 | Smith | Oct. 26, 1948 |
| 2,521,760 | Starr | Sept. 12, 1950 |
| 2,603,772 | Field | July 15, 1952 |
| 2,603,773 | Field | July 15, 1952 |

OTHER REFERENCES

Article by Pierce and Field, pp. 108–111, Proc. I. R. E. vol. 35, No. 2, Feb. 1947.